United States Patent [19]
Woollums et al.

[11] Patent Number: 5,062,449
[45] Date of Patent: Nov. 5, 1991

[54] VIBRATION DAMPENER FOR DIRECT ACTING PRESSURE REGULATOR

[75] Inventors: David E. Woollums, Allen; Donald D. Rice, Wylie, both of Tex.

[73] Assignee: Fisher Controls International, Inc., Clayton, Mo.

[21] Appl. No.: 636,082

[22] Filed: Dec. 28, 1990

[51] Int. Cl.$^5$ ............................................. G05D 16/06
[52] U.S. Cl. .......................... 137/505.46; 137/505.47; 137/116.5; 251/64
[58] Field of Search ...................... 137/505.46, 505.47, 137/116.5; 251/64

[56] References Cited

U.S. PATENT DOCUMENTS

| | | | |
|---|---|---|---|
| 1,893,254 | 1/1933 | Sweeney | 137/505.46 X |
| 4,149,559 | 4/1979 | Wormser | 137/505.18 |
| 4,889,158 | 12/1989 | Rice | 137/505.46 X |

Primary Examiner—Alan Cohan
Attorney, Agent, or Firm—Nicholas A. Camasto; Dale A. Kubly; Arnold H. Cole

[57] ABSTRACT

A drop compensated pressure regulator includes a spring casing, housing a regulator spring and a relief spring, a lower casing and a diaphragm sandwiched between the two casings. The lower casing has inlet and outlet ports. A one piece cam stem and relief seat is mounted for movement with the diaphragm and includes a cam surface that engages a movable disk holder. The disk holder is movable in a straight line within an orifice tube that supports a valve seat. A cylindrical lower spring seat is coupled by an O ring to the inner wall of the spring casing to dampen vibrations. The cam stem has built in stops to retain it within the orifice tube.

10 Claims, 3 Drawing Sheets

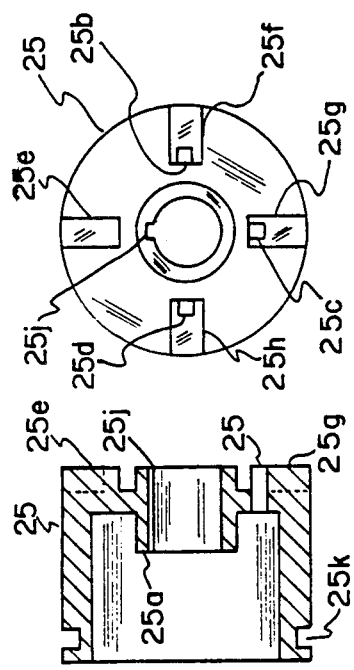
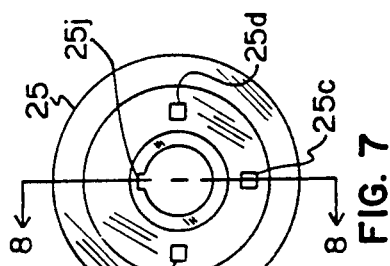
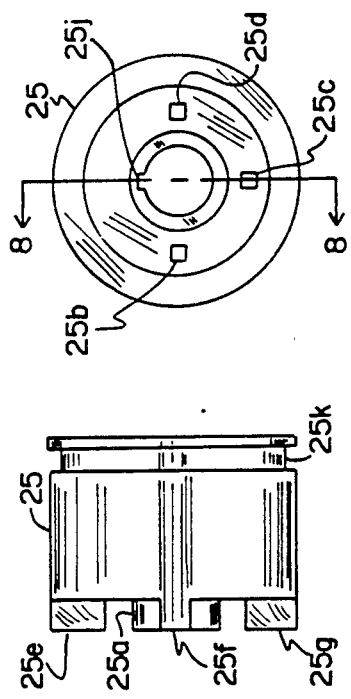
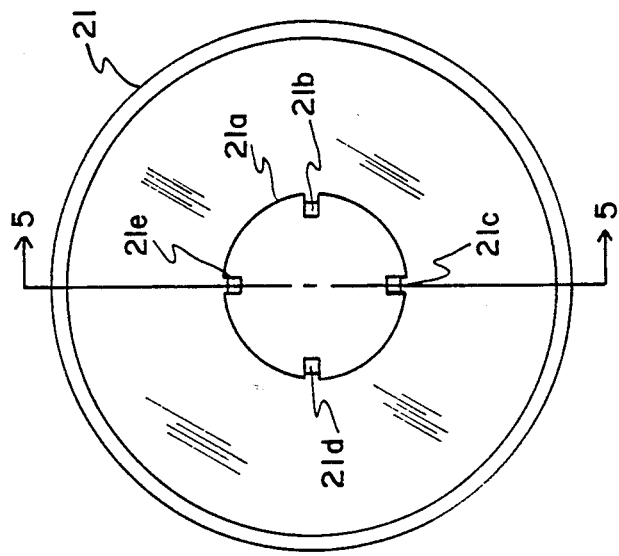
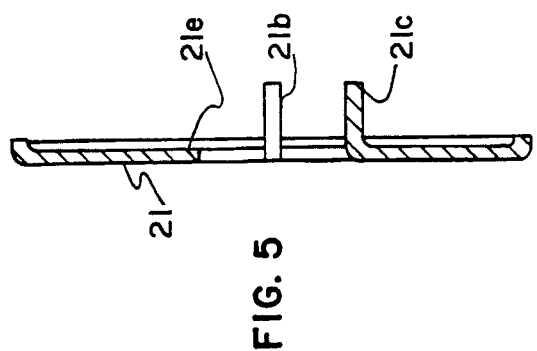

VIBRATION DAMPENER FOR DIRECT ACTING PRESSURE REGULATOR

BACKGROUND OF THE INVENTION AND PRIOR ART

This invention relates generally to gas pressure diaphragm regulator valves and particularly to liquified petroleum (LP) pressure regulator valve for residential use.

Gas pressure diaphragm type regulator valves are well-known in the art. In such valves, a valve disk and a mating seat assembly are positioned intermediate to an upstream and a downstream portion of a flowpath for controlling downstream pressure and gas flow by varying the valve opening, that is, the amount by which the valve disk is displaced from its associated valve seat. Gas pressure and flow regulation are achieved by modulating the valve opening to maintain the required downstream pressure while delivering the quantity of gas demanded by the load. The popular, low cost, single stage regulator valve includes a diaphragm that acts as both the measuring and the actuation device with the downstream pressure being applied to one side of the diaphragm against the force of an opposed, adjustable regulator spring. The spring force initially holds the diaphragm and the attached stem linkage mechanism in such a position so as to have retracted the valve disk from the valve seat. As upstream pressure is introduced, gas flow occurs through the seat to the disk opening and into the downstream side of the device. The downstream pressure force is applied against the diaphragm and enables the diaphragm to overcome the opposing regulator spring force, thereby moving the stem linkage and the valve disk to a position closer to the valve seat. In this manner, the adjustment of the regulator spring loading determines the downstream control pressure as a force equilibrium is achieved between the loading force of the spring and the force on the diaphragm from the downstream pressure. The linkage mechanism provides a mechanical advantage which enables a small diaphragm, actuated by very low downstream control pressures, to close the valve disk against the valve seat despite the relatively high pressure acting to push the disk open.

All single or first stage regulator valves experience "droop" in their pressure flow characteristic because the regulating spring changes in length and the effective area of the diaphragm changes as the diaphragm moves. These effects lower the downstream control pressure with flow increases. "Velocity boosting" is often used to apply a slightly lower pressure than the controlled downstream pressure to the diaphragm, thereby producing a larger valve opening and enabling greater gas flow.

It will be appreciated that in domestic gas service, the downstream pressure must be maintained at an extremely low level, on the order of 7 to 11 inches (approximately 18 to 28 centimeters) of water column pressure for natural gas and LP gas service, respectively, whereas the inlet or upstream pressure may be on the order of 60 psi (4.22 Kg per square centimeter) or more. Good pressure relief operation is required to preclude potentially serious over pressure conditions in the downstream system as well as to minimize annoying (and potentially dangerous) extinguishing of pilot lights in domestic appliances. However, the demands on gas pressure regulators, for domestic use in particular, are such that design compromises are required in the simple mechanical devices. For example, friction and hysteresis or backlash, inherent in linkage mechanisms, detract from the consistency of regulator performance. As mentioned, the spring effect and the diaphragm effect combine to cause output pressure droop. This droop will be overcome only at certain inlet pressures or across limited flow ranges by imprecise velocity boosting techniques The fixed mechanical advantage linkage mechanisms do nothing to overcome droop. In many current examples of the art, the relief valve is contained in an actuator housing which is separated from the body that houses the valve seat, forcing overpressured downstream gas to flow through restricting passages before reaching the relief valve for venting.

The gas pressure regulator valve described and claimed in U.S. Pat. No. 4,842,013, dated 6/27/89, entitled "Droop Compensated Direct Acting Pressure Regulator," in the names of D. D. Rice and M. E. Hood, and assigned to the assignee of the present invention, utilizes a combination of a characterized cam stem and an orifice tube (which is a valve seat with an integral boost tube). The characterized or contoured cam stem has a cam profile that is directly operable by the regulator spring and diaphragm for effecting rectilinear movement of a valve disk into and out of engagement with a valve seat at a nonlinear rate, without the intervention of any linkage mechanism. The cam stem provides a high mechanical advantage when required to close the valve disk against the seat, yet exhibits a low mechanical advantage to achieve rapid, nonlinear opening of the valve disk to mechanically induce a boost effect and maintain the desired downstream control pressure in all flow situations. The orifice tube aids in the uniformity of regulation by inducing a flow activated boost. Its configuration determines the space between the end of the tube and the valve outlet which in turn controls aspiration of the diaphragm cavity, which is the downstream pressure measuring element of the regulator. The direct acting pressure regulator valve is suitable for either natural gas or L/P gas service use by simply changing the predetermined, adjustable relief valve spring and regulator spring loads.

A removable boost end cap may also be provided for the orifice tube. The boost end cap has an orifice that is smaller in diameter than the diameter of the orifice tube and larger in diameter than the diameter of the valve seat, thus providing a design controlled boost effect. The boost end caps are manufactured with different size orifices for use with orifice tubes with corresponding size valve seats to enable a common valve design to have its individual operating characteristics tailored to different environmental conditions. The valve of the present invention is especially designed for LP gas residential service where the inlet pressure is higher than it is for natural gas. The invention is however also applicable to other types of valves and service.

Under certain pressure and flow conditions, the regulating mechanism might experience lower spring seat harmonic motion or vibration that could be annoying. In accordance with the invention, a dampener is placed on the lower spring seat which is fabricated in the form of a cylindrical insert. The dampener is an 0 ring that frictionally engages the interior of the spring chamber for dampening vibrations of the movable spring seat insert. The cam stem has also been changed to provide positive upper and lower stops to preclude lock up and pull out of the stem under abnormal operating conditions.

OBJECTS OF THE INVENTION

A principal object of the invention is to provide an improved gas pressure regulator valve.

Another object of the invention is to provide an improved movable valve sat for a gas pressure regulator valve.

A further object of the invention is to provide an improved LP gas pressure regulator valve that resists harmonic vibration.

BRIEF DESCRIPTION OF THE DRAWINGS

These and other objects and advantages of the invention will be apparent upon reading the following description in conjunction with the drawings, in which:

FIG. 4 is an enlarged plan view of the diaphragm head of the valve of FIG. 1;

FIG. 5 is a sectional view along the line 5—5 of FIG. 4;

FIG. 6 is a side view of the movable spring seat insert;

FIG. 7 is a top view of the spring seat insert;

FIG. 8 is a sectional view taken along line 8—8 of FIG. 7; and

FIG. 9 is a bottom view of the spring seat insert.

DESCRIPTION OF THE PREFERRED EMBODIMENTS

Figure 1:
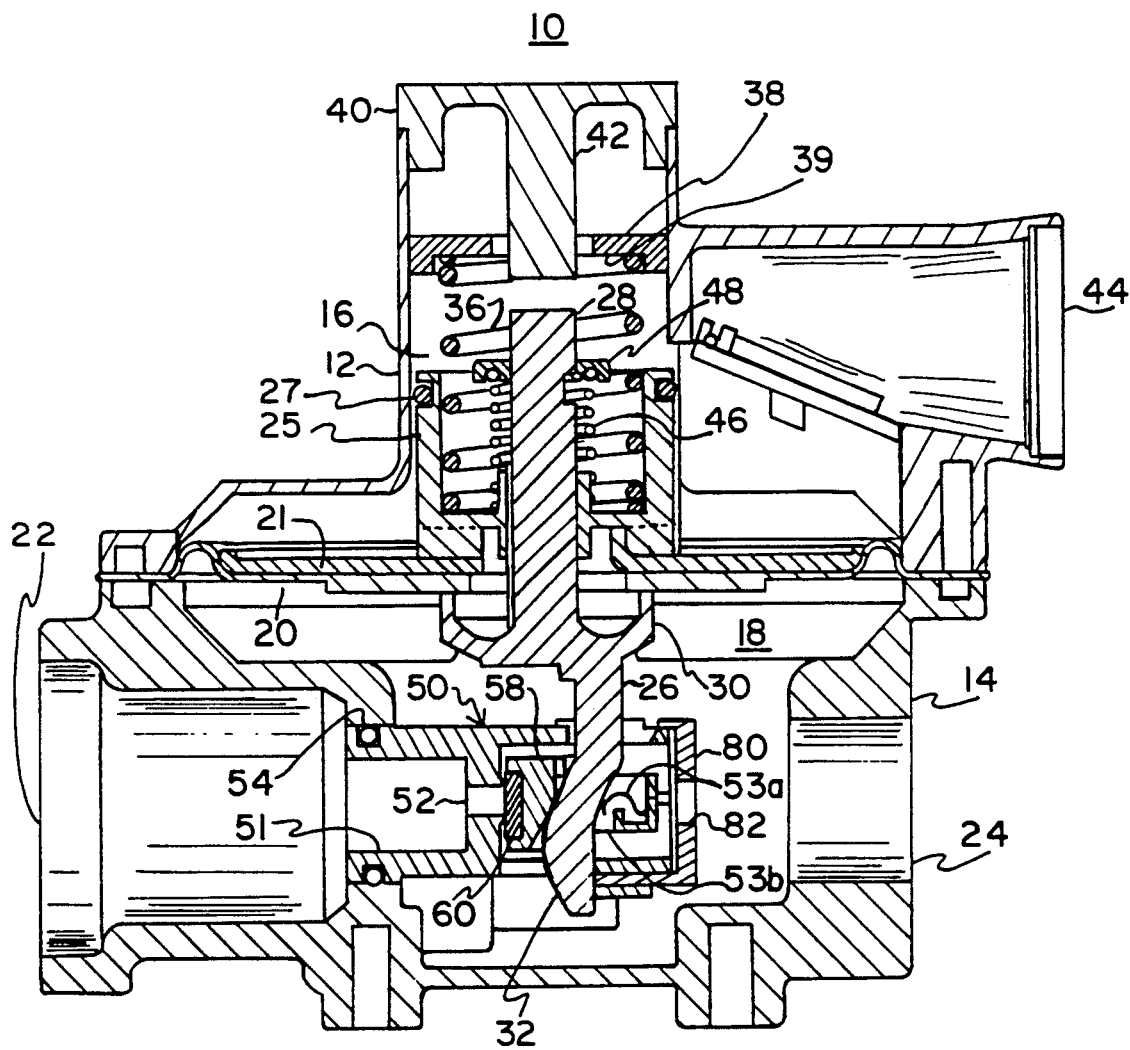
FIG. 1 is a cross section of a regulator valve constructed in accordance with the invention.
Figure 3:
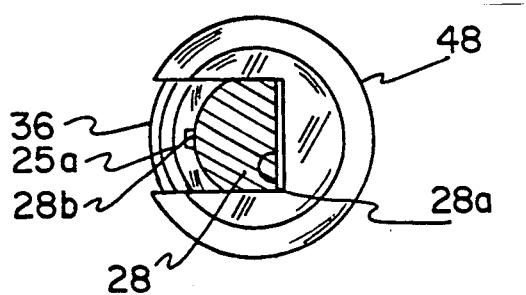
FIG. 3 is a partial sectional view taken along line 3—3 of FIG. 2.
Figure 2:
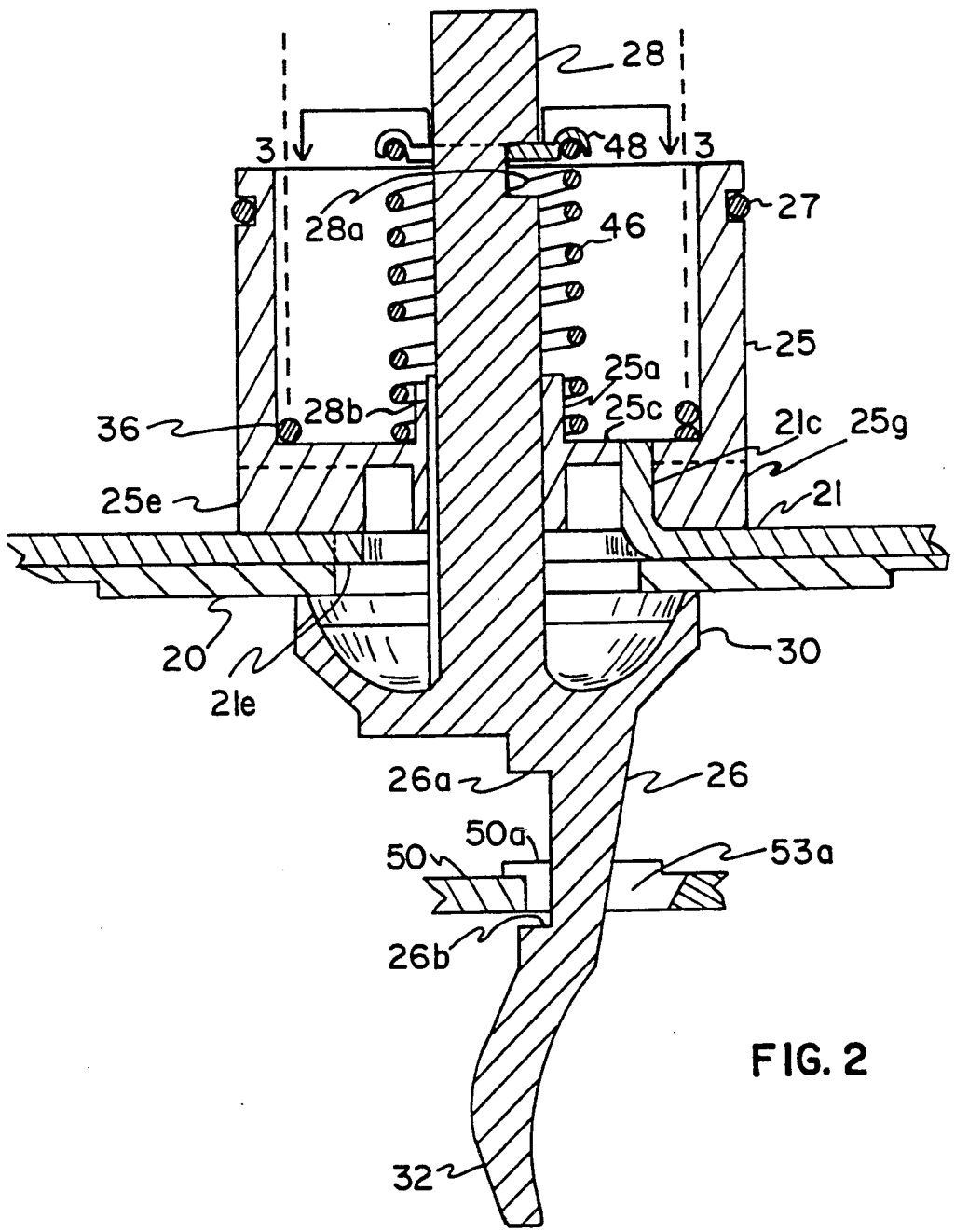
FIG. 2 is an enlarged cross sectional view of the cam stem and valve seat assembly of the valve of FIG. 1.

Referring to FIGS. 1, 2 and 3, a regulator valve 10 includes a spring housing or casing 12 that is assembled onto a regulator valve body or lower casing 14 by any conventional means. For example, the casings may include mating flanges along their peripheries that are secured together by suitable threaded fasteners and mating threaded apertures. These details are not illustrated. Spring casing 12 defines an upper chamber 16 and valve body 14 defines a lower chamber 18 of large volume. Separating these two chambers is an elastomeric, flat, generally annular diaphragm 20 that is affixed to a large diameter, flat diaphragm head 21. The circular, outer periphery of diaphragm 20 is captivated between the flanges of spring casing 12 and valve body 14. The inner portion of diaphragm 20 is secured to diaphragm head 21 by gluing or the like. Diaphragm head 21 has three centrally disposed upstanding legs 21b, 21c and 21d (FIGS. 4 and 5) and defines a plurality of large apertures between the upstanding legs. In normal operation the apertures are sealed off from lower chamber 18 by a generally cup-shaped, relief seat 30 that is an integral part of a cam stem 26. Cam stem 26 includes an upstanding cylindrical post 28. A cylindrical insert 25, defining a pair of lower spring seats, is slidably mounted on post 28. As will be seen, cylindrical post 28 has a rectangular key 28b that is matched by a similarly shaped keyway 25j (FIG. 7). Pressure is applied to seal the underside of diaphragm 20 with relief seat 30 by a relief spring 46 that is captivated between seat insert 25 and an upper seat 48. The upper seat 48 engages a slot 28a in post 28. As shown in FIG. 3, upper seat 48 comprises a slotted C type washer or annular metallic collar that is slid into place on the upper portion of cylindrical post 28. The loading of relief spring 46 maintains upper seat 48 in position. This construction technique eliminates a number of manufacturing tolerances and enhances the uniformity of product performance. Relief spring 46 is loaded such that, for normal operating pressures, diaphragm head 21 does not move relative to cam stem 26 and consequently relief seat 30 remains in engagement with the underside of diaphragm 20.

When the diaphragm and relief seat are engaged, there is no gas flowpath from valve body 14 to spring casing 12. When an over pressure condition exists such that diaphragm head 21 is driven upward with respect to cam stem 26, the seal between diaphragm 20 and relief seat 30 is broken and gas flow occurs from lower chamber 18, round relief seat 30 and through the apertures defined by the upstanding legs 21b, 21c and 21d of diaphragm head 21, to upper chamber 16. This design enables rapid flow of escaping gas to aid relief performance.

The upper portion of spring casing 12 is closed by a closing cap 40. An adjustable regulator spring 36 is captivated between diaphragm head 21 and an upper spring seat 39 formed in the bottom of a vertically displaceable adjustment screw 38 that may be turned for increasing or decreasing the force exerted by regulator spring 36 on the diaphragm head. Cap 40 includes a downwardly projecting travel stop 42 to limit the upward movement of cam stem 26 and force the regulator into relief operation in the event of a catastrophic failure of the valve mechanism, i.e. a fail to either close in response to a cessation of gas demand (debris on the valve seat, for example) or to relieve over pressure through normal relief operation. Spring casing 12 also defines a relief vent 44 by means of which upper chamber 16 communicates with the external environment.

Regulator valve body 14 includes an inlet port 22 and an outlet port 24 that may be threadingly engageable (not shown) for connection of the regulator valve in a pipeline (not shown) in which gas flows. While inlet port 22 and outlet port 24 are generally axially aligned as shown to provide a relatively straight through flowpath for the gas in the pipeline, different configurations are also contemplated. Cam stem 26 terminates in a stem end 32 having similar front and rear cam profiles. Stem end 32 extends through a pair of generally rectangular openings 453a and 53b in a cylindrical orifice tube 50 having a length that extends over a substantial portion of the distance between inlet port 22 and outlet port 24. Orifice tube 50 is secured in valve body 14 and forms a gas tight seal with the inner wall of inlet port 22 by means of an O ring 54 and has an entrance way that forms a circular valve seat 52. Orifice tube 50 also has a boost end cap 80 for providing a velocity boosting effect to gas flow therethrough to produce, by aspiration of the chamber by the flow velocity, a slightly lower pressure on the underside of diaphragm 20 than exists at outlet port 24. A valve disk 60 is carried by a disk holder 58 that is horizontally movable within orifice tube 50 in response to vertical movement of cam stem 26 at right angles thereto. This is accomplished by suitable cam follower surfaces on disk holder 58 that are engageable with the front cam surface on stem end 32. Disk holder 58 is confined to straight line axial movement within orifice tube 50 by means of a pair of oppositely disposed parallel grooves in the orifice tube. A bias spring engages the rear cam surface of stem end 32 and serves to compensate for hysteresis effects in valve operation. Boost end cap 80 is removably secured to the end of orifice tube 50. An orifice 82 is provided in the back of boost end cap 80 for modifying the boost effects by aspiration of lower chamber 18.

It should be noted that the underside of diaphragm 20 is substantially in direct communication with the flow-path that exists between inlet port 22 and outlet port 24. This arrangement, in conjunction with a large relief seat 30 on cam stem 26, enables fast, effective high pressure relief operation in the event of a sudden increase in outlet or downstream pressure, as described above. It should also be noted that the vertical movement of cam stem 26 is directly translated into straight line horizontal movement of valve disk 60 with respect to valve seat 52. There is no linkage mechanism, i.e., levers or pivots, to impose frictional losses or introduce mechanical play. Thus with the construction of the inventive arrangement, tight control over outlet pressure and flow, with excellent pressure relief, is achievable in a simple, low cost, direct operated regulator.

Referring additionally to FIGS. 6-9, the configuration of spring seat insert 25 is more clearly shown. It includes a cylindrical collar 25a that is slidable along stem 28 and has three depending feet, only two of which, 25e and 25g, are shown in the figure. These feet press against the top surface of diaphragm head 21. Spring seat insert 25 includes an annular groove (25k) that supports a rubber or plastic O ring 27 which engages, in light frictional contact, the inner wall of the spring housing 12. The feet 25e, 25f, 25g and 25h of the spring insert 25 are positioned at right angles and present little interference to gas flow through the apertures formed between the upstanding legs of diaphragm head 21.

The lower portion 32 of cam stem 26 forms an upper stop 26a and a lower stop 26b which are engageable with orifice tube 50. As mentioned, these stops preclude the possibility of lock up of the cam stem and orifice tube under over pressure conditions and provide a positive limit to downward travel of the cam stem during abnormal low inlet pressure conditions.

In FIGS. 4 and 5, the details of diaphragm bead 21 are shown. The head 21 includes a central circular opening 21a in which three upstanding legs 21b, 21c and 21d are formed along with a radially extending tab 21e. As will be seen, the legs engage corresponding boles in spring insert 25 for location purposes.

FIGS. 6-9 show construction details of spring seat insert 25. The keyway 25j in collar 25a will particularly be noted. Keyway 25j mates with key 28b on upper portion 28 of cam stem 26 for alignment 35 purposes. The four feet 25e, 25f, 25g and 25h that are formed in the bottom of insert 25 support it on the upper surface of diaphragm head 21. Three square holes 25b, 25c and 25d are adapted to receive the ends of upstanding legs 21b, 21c and 21d, respectively, of diaphragm head 21. As mentioned, the annular groove 25k receives O ring 27 for providing slight frictional engagement with the inner wall of upper spring casing 12. This has been found to eliminate harmonic vibrations of the spring seat under any conditions of pressure and gas flow that are likely to be encountered.

The regulator is preferably constructed of lightweight but strong materials. The cam stem, orifice tube and disk holder may be fabricated of engineering resins of inherently high self-lubricity or the like to provide strength and low friction. Parts that move against each other are constructed of different materials. Thus the valve disk holder 58 is made of nylon, as is the boost end cap, to provide bearing surfaces with the orifice tube and cam stem, which are made of acetal plastic.

The diaphragm may be fabricated from any well-known elastomeric materials utilized for such purposes. The cam stem and relief seat are preferably molded in a single piece. As should be apparent to those skilled in the art, changing the diameter of the orifice in the valve seat and the configuration of the cam surfaces as well as altering the size of the hole in the boost and cap will enable manufacturer to provide low cost as pressure regulator valves to meet a wise range of environmental and operating conditions. In practice, the size of the valve seat orifice and boost end cap orifice are changed in pairs to meet specific opening characteristics. As is well known, the smaller the orifice in the boost end cap, the more gas is diverted to the lower chamber via the rectangular openings in the orifice tube and the less the boost effect, especially at higher flow rates.

It is recognized that numerous modifications in the described invention will be apparent to those skilled in the art without departing from its true spirit and scope. The invention is to be limited only as defined in the claims.

What is claimed is:

1. A regulator valve having a body including a spring housing and an inlet and an outlet comprising:
    diaphragm means including a diaphragm head;
    spring means in said spring housing applying a regulating force to one side of said diaphragm head;
    a cylindrical spring cage in said spring housing in engagement with said diaphragm head and coupling said spring means to said diaphragm head;
    valve means coupled beaten said inlet and said outlet;
    stem means coupled to said diaphragm means and having an end coupled to said valve means for controlling flow from said inlet to said outlet; and
    dampener means coupling said spring cage to said spring housing for suppressing vibrations in said regulator valve.

2. The valve of claim 1 wherein said cylindrical spring cage surrounds a portion of said spring means and forms a spring seat and wherein said dampener means includes a friction member coupling said cylindrical spring cage to said spring housing.

3. The valve of claim 2 wherein said friction member is an O ring and wherein a groove is formed in the periphery of said cylindrical spring cage for captivating said O ring.

4. The valve of claim 3 wherein said valve means include:
    an orifice tube including a valve seat;
    a movable valve disk means in said orifice tube and coupled to said stem means for controlling the relative positioning of said valve disk means and said valve seat; and
    stop means on said stem means for precluding over-travel of said stem means with respect to said valve disk means.

5. The valve of claim 4 wherein said orifice tube includes an opening permitting said stem means to engage said valve disk means; and wherein said stop means comprise a notched out portion of said stem means for causing interference between said stem means and said orifice tube in the event of overtravel of said stem means.

6. A droop compensated regulator valve including a spring housing and having an inlet and an outlet comprising:

diaphragm means including a diaphragm head;

a cylindrical spring cage in said spring housing and forming a spring seat in communication with said diaphragm head;

a spring in said spring housing engaging said spring seat for applying a regulating force to one side of said diaphragm head;

valve means coupled to said inlet and including a valve seat and a movable valve disk means movable in a straight line into and out of engagement with said valve seat;

stem means coupled to said diaphragm means and having a cam profile for adjusting the position of said valve disk means with respect to said valve seat, responsive to movement of said diaphragm means;

an orifice tube supporting said valve sat and said movable valve disk means and including boost means communicating with said outlet for reducing pressure on the other side of said diaphragm means; and dampener means coupling said spring cage to said spring housing for suppressing vibrations in said regulator valve.

7. The valve of claim 6 wherein said spring cage is slidably mounted to said stem means and wherein said dampener means includes a friction member coupling said sprig cage to said spring housing.

8. The valve of claim 7 wherein said friction member comprises an O ring mounted in a circumferential groove on said spring cage and engaging said spring housing.

9. The valve of claim 8, further including:

a movable valve disk means coupled to said stem means for controlling the relative positioning of said valve disk means and said valve seat; and stop means on said stem means for precluding overtravel of said stem means with respect to said valve disk means.

10. The valve of claim 9 wherein said orifice tube includes an opening permitting said stem means to engage said valve disk means; and wherein said stop means comprise a notched out portion of said stem means for causing interference between said stem means and said orifice tube in the event of overtravel of said stem means.

* * * * *

UNITED STATES PATENT AND TRADEMARK OFFICE
CERTIFICATE OF CORRECTION

PATENT NO. : 5,062,449

DATED : November 5, 1991

INVENTOR(S) : David E. Woollums & Donald D. Rice

It is certified that error appears in the above-identified patent and that said Letters Patent is hereby corrected as shown below:

```
In the Abstract, line  1, delete "drop", insert --droop--;
Column   2, line   9, after "techniques", insert --.--;
Column   3, line   8, delete "sat", insert --seat--;
Column   4, line  47, delete "453a", insert --53a--;
Column   5, line  42, delete "bead", insert --head--;
Column   5, line  46, delete "boles", insert --holes--;
            line  51, delete "35";
Column   6, line  10, delete "and", insert --end--;
            line  11, delete "as", insert --gas--;
            line  12, delete "wise", insert --wide--;
            line  15, delete "opening", insert --operating--;
            line  34, delete "beaten", insert --between--;
Column   7, line  20, delete "sat", insert --seat--;
Column   8, line   7, delete "sprig", insert --spring--.
```

Signed and Sealed this

Ninth Day of March, 1993

Attest:

STEPHEN G. KUNIN

Attesting Officer

Acting Commissioner of Patents and Trademarks